US012657658B2

(12) United States Patent
Yamamoto

(10) Patent No.: US 12,657,658 B2
(45) Date of Patent: Jun. 16, 2026

(54) EXECUTING RECONSTRUCTION OF INTERFEROMETRIC PHASE MICROSCOPY IMAGES BASED ON INTERFERENCE FRINGE QUALITY

(71) Applicant: FUJIFILM Corporation, Tokyo (JP)

(72) Inventor: Hiroaki Yamamoto, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 301 days.

(21) Appl. No.: 18/448,606

(22) Filed: Aug. 11, 2023

(65) Prior Publication Data

US 2023/0401715 A1    Dec. 14, 2023

Related U.S. Application Data

(63) Continuation of application No. PCT/JP2021/047727, filed on Dec. 22, 2021.

(30) Foreign Application Priority Data

Feb. 26, 2021    (JP) ................................. 2021-031211

(51) Int. Cl.
*G06T 3/4053*        (2024.01)
*G06T 7/00*          (2017.01)

(52) U.S. Cl.
CPC .......... *G06T 3/4053* (2013.01); *G06T 7/0016* (2013.01); *G06T 2207/10056* (2013.01);
(Continued)

(58) Field of Classification Search
CPC ......... G06T 2207/30168; G06T 7/0016; G06T 2207/10056; G06T 2207/30024; C12M 1/34
See application file for complete search history.

(56) References Cited

U.S. PATENT DOCUMENTS 5,636,020 A * 6/1997 Csipkes ................. G01B 11/24
                                                  356/477
9,915,565 B2 * 3/2018 Katzir .................. G02B 27/144
(Continued)

FOREIGN PATENT DOCUMENTS

CN        106979758 A * 7/2017 ........... G01B 11/254
CN        108169888 A * 6/2018 ........... G02B 21/361
(Continued)

OTHER PUBLICATIONS

Igor Gurov, Elena Ermolaeva, and Alexey Zakharov, "Analysis of low-coherence interference fringes by the Kalman filtering method," J. Opt. Soc. Am. A 21, 242-251 (2004) (Year: 2004).*
(Continued)

*Primary Examiner* — Michael Robert Cammarata
(74) *Attorney, Agent, or Firm* — Sughrue Mion, PLLC

(57)        ABSTRACT

Provided is an information processing apparatus that acquires image data from an imaging apparatus including a light source and an imaging sensor and generating the image data by capturing an interference fringe image generated by irradiating an observation object with illumination light, and processes the acquired image data. The information processing apparatus includes a processor. The processor is configured to: extract a feature amount from the image data; and determine a quality of the interference fringe image included in the image data based on the feature amount.

5 Claims, 14 Drawing Sheets

(52) U.S. Cl.
CPC .............. *G06T 2207/30024* (2013.01); *G06T 2207/30168* (2013.01)

(56) References Cited

U.S. PATENT DOCUMENTS

| | | | | |
|---|---|---|---|---|
| 10,857,828 | B2 * | 12/2020 | Okada ....................... | G03H 1/02 |
| 2011/0019910 | A1 | 1/2011 | Kameyama | |
| 2015/0079621 | A1 | 3/2015 | An et al. | |
| 2016/0379353 | A1 * | 12/2016 | Makifuchi ........... | A61B 6/5264 |
| | | | | 382/131 |
| 2020/0096940 | A1 * | 3/2020 | Yamakawa .......... | G03H 1/0005 |
| 2022/0083004 | A1 | 3/2022 | Nakamura et al. | |
| 2023/0121799 | A1 * | 4/2023 | Yamamoto ........... | H04N 23/675 |
| | | | | 348/345 |

FOREIGN PATENT DOCUMENTS

| | | | | | |
|---|---|---|---|---|---|
| CN | 108198175 | A | * | 6/2018 | ........... G06T 7/0002 |
| CN | 110579167 | A | * | 12/2019 | ............ G01B 9/021 |
| JP | 2018509616 | A | * | 4/2018 | ........... H04N 23/951 |
| WO | WO-2009125578 | A1 | * | 10/2009 | ............ H04N 19/17 |

| | | | | | |
|---|---|---|---|---|---|
| WO | 2018/158947 | A1 | | 9/2018 | |
| WO | WO-2020039470 | A1 | * | 2/2020 | .............. G06T 3/00 |
| WO | 2020/261826 | A1 | | 12/2020 | |
| WO | WO-2020262551 | A1 | * | 12/2020 | .............. C12Q 1/04 |

OTHER PUBLICATIONS

Marco Hering, Klaus Körner, and Bernd Jähne, "Correlated speckle noise in white-light interferometry: theoretical analysis of measurement uncertainty," Appl. Opt. 48, 525-538 (2009) (Year: 2009).*

Pavel Pavliček and Ondřej Hýbl, "White-light interferometry on rough surfaces—measurement uncertainty caused by surface roughness," Appl. Opt. 47, 2941-2949 (2008) (Year: 2008).*

Communication issued May 27, 2025 in Japanese Patent Application No. 2023-502108.

International Search Report issued Mar. 22, 2022 in International Application No. PCT/JP2021/047727.

Written Opinion issued Mar. 22, 2022 in International Application No. PCT/JP2021/047727.

International Preliminary Report on Patentability dated Aug. 29, 2023 with a Translation of the Written Opinion of the International Searching Authority in Application No. PCT/JP2021/047727.

* cited by examiner

EXECUTING RECONSTRUCTION OF INTERFEROMETRIC PHASE MICROSCOPY IMAGES BASED ON INTERFERENCE FRINGE QUALITY

CROSS-REFERENCE TO RELATED APPLICATION

This application is a continuation application of International Application No. PCT/JP2021/047727, filed Dec. 22, 2021, the disclosure of which is incorporated herein by reference in its entirety. Further, this application claims priority from Japanese Patent Application No. 2021-031211 filed on Feb. 26, 2021, the disclosure of which is incorporated herein by reference in its entirety.

BACKGROUND

1. Technical Field

The technology of the present disclosure relates to an information processing apparatus, an information processing method, and a program.

2. Description of the Related Art

Although, in the related art, a microscope such as a phase contrast microscope has been used for observing cells or the like, it is necessary to perform focusing in imaging an observation object. Therefore, in recent years, lens-free digital holography, which does not require focusing in imaging an observation object, has been used (see, for example, WO2018/158947A).

In digital holography, an interference fringe image generated by irradiating an observation object with coherent light such as a laser beam is captured, and the interference fringe image obtained by the imaging is reconstructed, whereby a reconstructed image (so-called tomographic image) at an optional focal position can be generated.

SUMMARY

However, since, in digital holography, an interference fringe image generated by irradiating an observation object with light such as a laser beam is used, in a case where a foreign substance such as an air bubble is present between a light source and the observation object, the interference fringe image may not be generated due to an influence of a refractive index of the foreign substance, and a reconstructed image representing the observation object may not be obtained.

Since a reconstruction process takes a long time, in a case where the observation object is imaged again in a case where it is found that the interference fringe image has not been obtained after the reconstruction process has been obtained, time is wasted and observation efficiency is reduced.

An object of the technology of the present disclosure is to provide an information processing apparatus, an information processing method, and a program that can improve observation efficiency.

In order to achieve the above object, according to the present disclosure, there is provided an information processing apparatus that acquires image data from an imaging apparatus including a light source and an imaging sensor and generating the image data by capturing an interference fringe image generated by irradiating an observation object with illumination light, and processes the acquired image data, the information processing apparatus comprising: a processor, in which the processor is configured to: extract a feature amount from the image data; and determine a quality of the interference fringe image included in the image data based on the feature amount.

It is preferable that the processor is configured to: execute a reconstruction process based on the image data; and determine whether the reconstruction process is executable or not based on a determination result of the quality of the interference fringe image.

It is preferable that the processor is configured to extract the feature amount by template matching or frequency analysis based on the image data.

It is preferable that the processor is configured to determine presence or absence of the interference fringe image or a change of the interference fringe image in the image data based on the feature amount.

It is preferable that the light source has a plurality of light emitting points, and that the imaging apparatus generates a plurality of pieces of the image data by performing an imaging operation a plurality of times while causing the light emitting points to emit light in sequence.

It is preferable that the processor is configured to calculate the feature amount based on a temporal change of the interference fringe images that are continuous in time series, which are included in the plurality of pieces of image data.

It is preferable that the processor is configured to calculate a correlation value or a difference value between the interference fringe images that are continuous in time series, as the feature amount.

It is preferable that the processor is configured to: execute a super-resolution process of generating high-resolution image data based on the plurality of pieces of image data and a reconstruction process based on image data generated by the super-resolution process; and determine whether the super-resolution process and the reconstruction process are executable or not based on a determination result of the quality of the interference fringe image.

It is preferable that the observation object is a fertilized egg or a floating cell other than the fertilized egg.

According to the present disclosure, there is provided an information processing method of acquiring image data from an imaging apparatus including a light source and an imaging sensor and generating the image data by capturing an interference fringe image generated by irradiating an observation object with illumination light, and processing the acquired image data, the information processing method comprising: extracting a feature amount from the image data; and determining a quality of the interference fringe image included in the image data based on the feature amount.

According to the present disclosure, there is provided a program causing a computer to execute a process of acquiring image data from an imaging apparatus including a light source and an imaging sensor and generating the image data by capturing an interference fringe image generated by irradiating an observation object with illumination light, and processing the acquired image data, the process comprising: extracting a feature amount from the image data; and determining a quality of the interference fringe image included in the image data based on the feature amount.

According to the technology of the present disclosure, it is possible to provide an information processing apparatus, an information processing method, and a program that can improve observation efficiency.

BRIEF DESCRIPTION OF THE DRAWINGS

Exemplary embodiments according to the technique of the present disclosure will be described in detail based on the following figures, wherein.

DETAILED DESCRIPTION

An example of an embodiment relating to the technology of the present disclosure will be described with reference to the accompanying drawings.

First Embodiment

Figure 1:
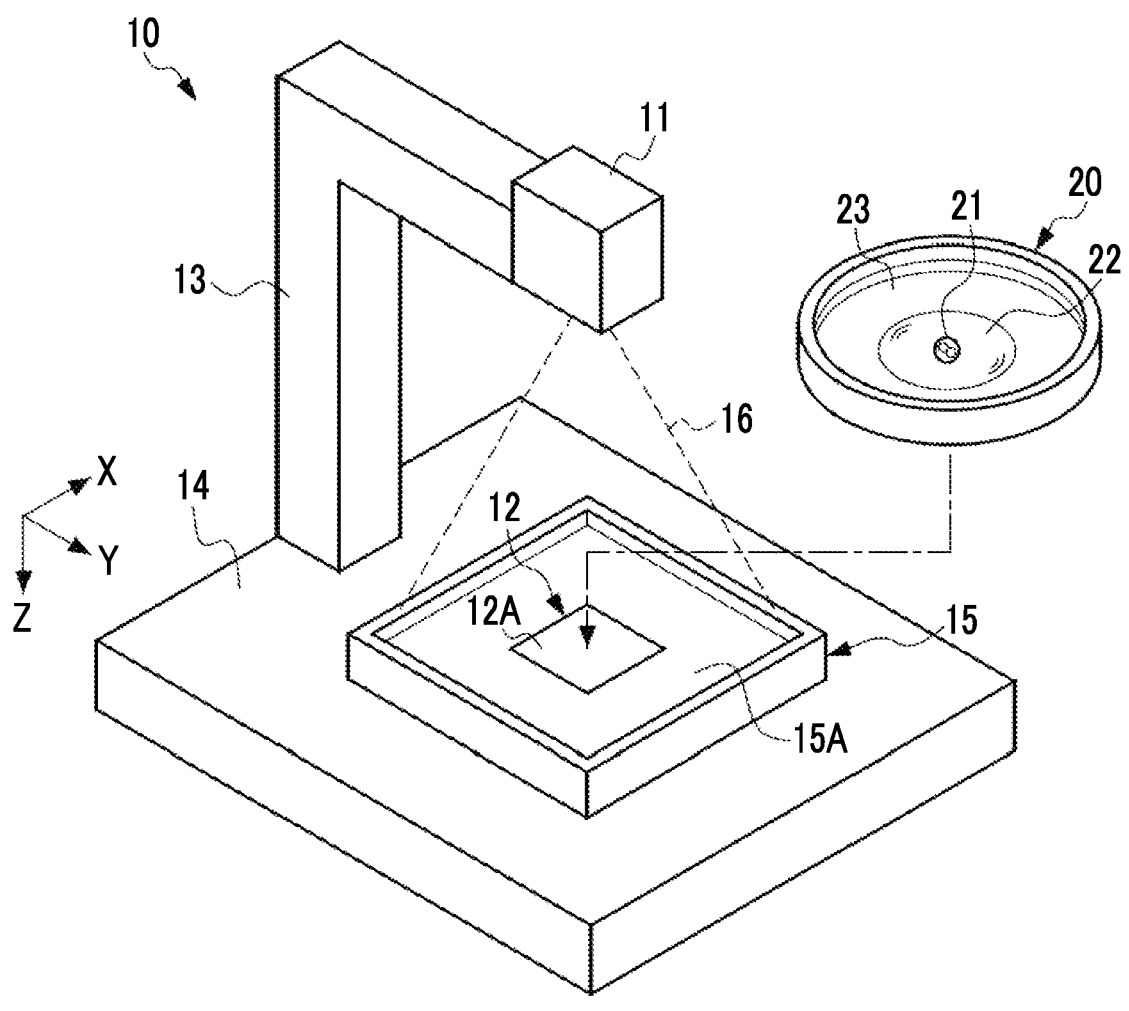
FIG. 1 is a perspective view showing an example of an imaging apparatus.

FIG. 1 shows an example of a configuration of an imaging apparatus. The imaging apparatus 10 includes a light source 11, an imaging sensor 12, a support column 13, a base 14, and a stage 15. The light source 11 is, for example, a laser diode. The imaging apparatus 10 performs so-called lens-free imaging in which an observation object is imaged without using an optical lens.

The light source 11 may be configured by combining a light emitting diode and a pinhole. The light source 11 emits radial illumination light 16 toward the stage 15. The illumination light 16 is coherent light. A wavelength of the illumination light 16 is 640 nm, 780 nm, or the like.

The light source 11 is connected to one end of the support column 13 having a substantial L shape. The other end of the support column 13 is connected to the base 14. The base 14 has a flat plate shape, and the stage 15 is provided substantially in the center. The stage 15 is provided with a recessed placing part 15A on which a culture container 20 for culturing a fertilized egg is placed. The support column 13 supports the light source 11 such that the light source 11 faces an imaging surface 12A of the imaging sensor 12. The fertilized egg is an example of an "observation object" according to the technology of the present disclosure.

Hereinafter, a direction in which the light source 11 and the imaging surface 12A face each other is referred to as a Z direction. The Z direction is also an irradiation direction of the illumination light 16. In addition, one direction orthogonal to the Z direction is called an X direction. A direction orthogonal to the Z direction and the X direction is called a Y direction. The imaging surface 12A is orthogonal to the Z direction and is parallel to the X direction and the Y direction.

The imaging sensor 12 is configured of, for example, a monochrome complementary metal oxide semiconductor (CMOS) imaging sensor. The culture container 20 is placed on the imaging surface 12A of the imaging sensor 12. The culture container 20 is a shallow cylindrical container, and is also called a culture dish. The culture container 20 is used together with a lid 25 (see FIG. 2). The culture container 20 is transparent and transmits the illumination light 16. A diameter of the culture container 20 is about 30 to 60 mm. A thickness of the culture container 20 is about 10 to 20 mm.

A fertilized egg 21 that has been subjected to in-vitro fertilization is sown in the culture container 20. Examples of the in-vitro fertilization include microinsemination performed under a microscope and normal in-vitro fertilization in which an egg and a sperm are treated together in a predetermined container. A method of fertilizing the fertilized egg 21 to be cultured does not matter. The fertilized egg 21 is, for example, a human fertilized egg. The fertilized egg 21 is substantially spherical and has a diameter of about 100 to 200 μm.

The fertilized egg 21 floats in a culture solution 22 added dropwise into the culture container 20. The culture solution 22 is covered with oil 23 filling the culture container 20. The oil 23 suppresses evaporation of the culture solution 22 and a change in pH. The fertilized egg 21 in a dividing state is also called an embryo. The fertilized egg 21 in the present disclosure includes an embryo.

Figures 2, 3:
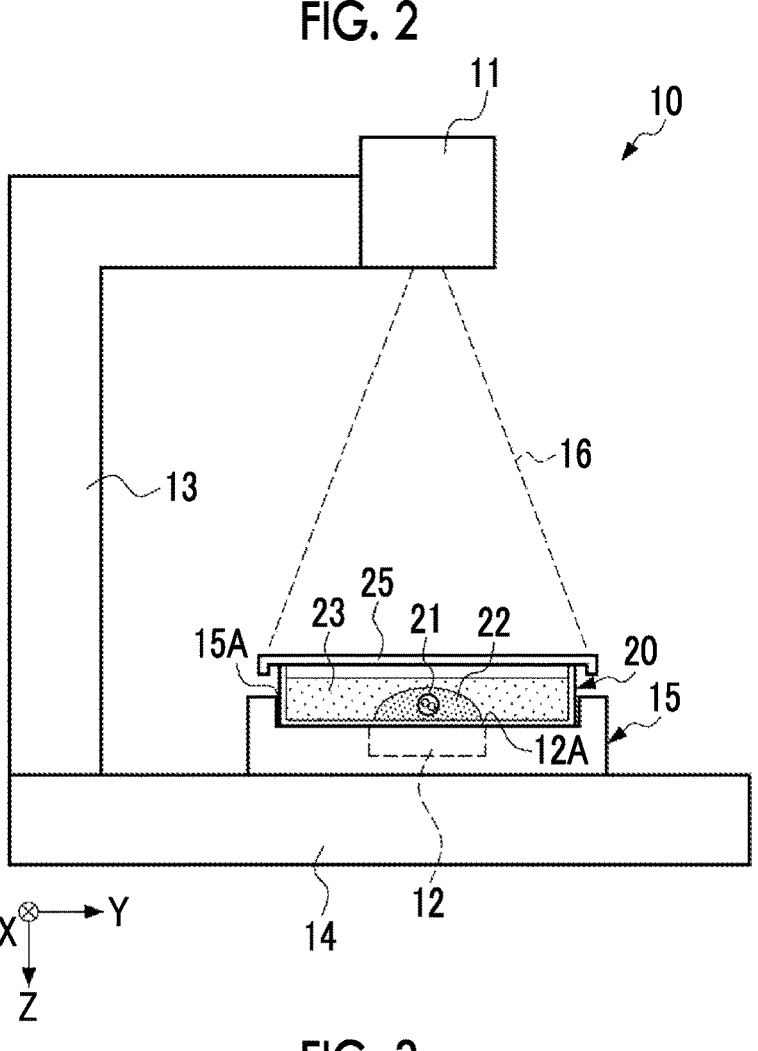
FIG. 2 is a side view of an imaging apparatus on which a culture container is placed.
FIG. 3 is a diagram showing an example of a configuration of an imaging sensor.

FIG. 2 is a side view of the imaging apparatus 10 on which the culture container 20 is placed. As shown in FIG. 2, the imaging apparatus 10 images the fertilized egg 21 in a state where the culture container 20 is covered with the lid 25.

The imaging sensor 12 detects the illumination light 16 emitted from the light source 11 and transmitted through the culture container 20. Specifically, the illumination light 16 is incident into the culture container 20, and the illumination light 16 is diffracted by the fertilized egg 21, so that an interference fringe image reflecting a shape and an internal structure of the fertilized egg 21 is generated. The interference fringe image is also called a hologram image. The imaging sensor 12 captures the interference fringe image generated by the fertilized egg 21.

FIG. 3 shows an example of a configuration of the imaging sensor 12. The imaging sensor 12 has a plurality of pixels 12B disposed on the imaging surface 12A. The pixel 12B is a photoelectric conversion element that outputs a pixel signal according to the amount of incidence light by photoelectrically converting the incidence light.

The pixels 12B are arranged at equal pitches along the X direction and the Y direction. The array of the pixels 12B is a so-called square array. The X direction is a direction orthogonal to the Z direction. The Y direction is a direction orthogonal to the X direction and the Z direction. The pixels 12B are arranged at a first arrangement pitch $\Delta x$ in the X direction and are arranged at a second arrangement pitch $\Delta y$ in the Y direction.

The imaging sensor 12 images the light incident on the imaging surface 12A, and outputs image data configured of the pixel signal output from each of the pixels 12B.

Figure 4:
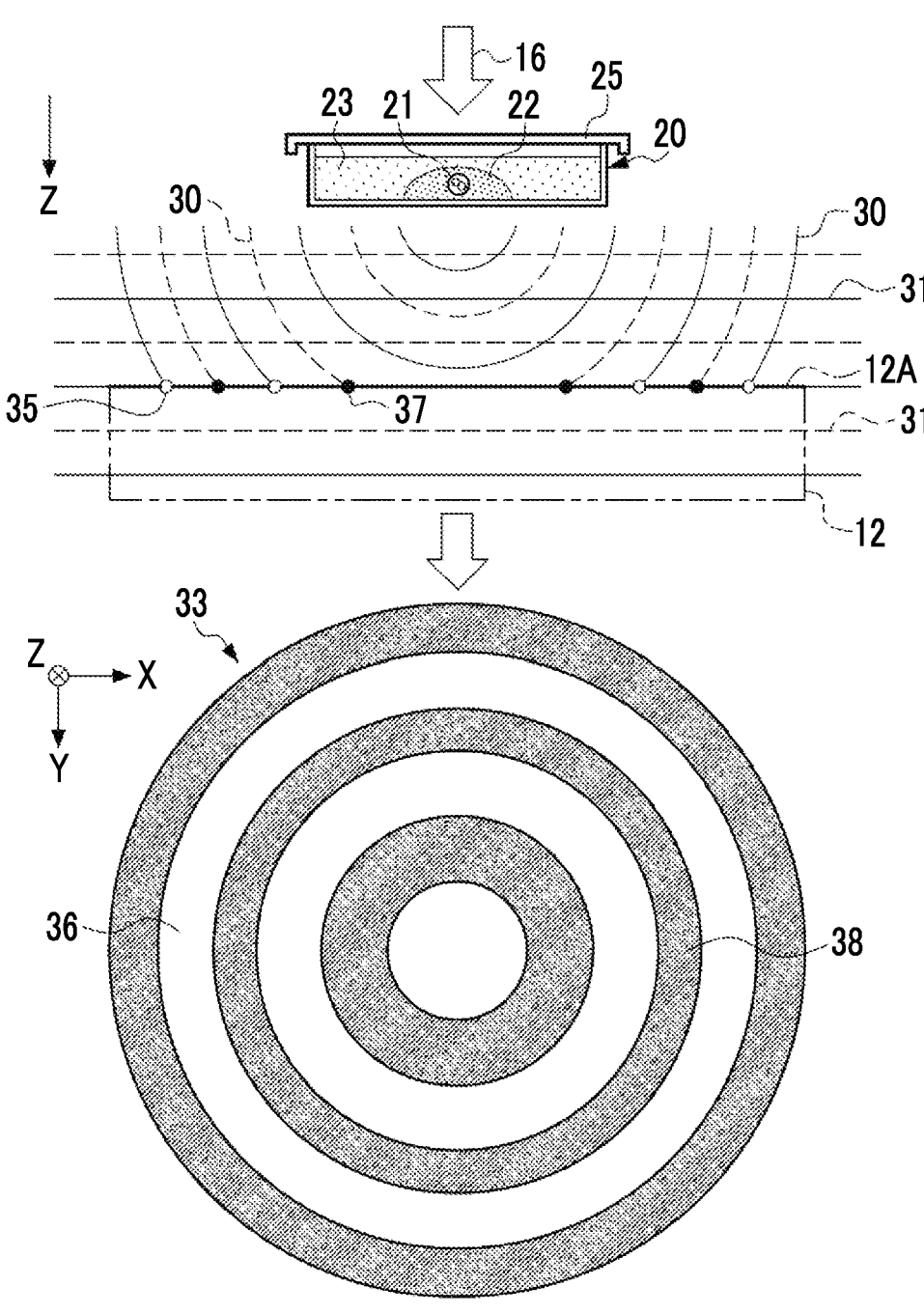
FIG. 4 is a diagram showing a state in which an interference fringe image is generated by irradiating a fertilized egg with illumination light.

FIG. 4 shows a state in which an interference fringe image is generated by irradiating the fertilized egg 21 with the illumination light 16. A part of the illumination light 16 incident into the culture container 20 is diffracted by the fertilized egg 21. That is, the illumination light 16 is divided into diffracted light 30 diffracted by the fertilized egg 21 and transmitted light 31 that is not diffracted by the fertilized egg 21 and is transmitted through the culture container 20. The transmitted light 31 is a spherical wave or a plane wave. The diffracted light 30 and the transmitted light 31 are transmitted through the bottom surface of the culture container 20 and are incident on the imaging surface 12A of the imaging sensor 12.

The diffracted light 30 and the transmitted light 31 interfere with each other to generate an interference fringe image 33. The interference fringe image 33 is configured of a bright portion 36 and a dark portion 38. In FIG. 4, although the interference fringe image 33 shows the bright portion 36 and the dark portion 38 as circles, a shape of the interference fringe image 33 changes according to the shape and the internal structure of the fertilized egg 21. The imaging sensor 12 captures an optical image including the interference fringe image 33 formed on the imaging surface 12A, and outputs image data including the interference fringe image 33.

Figure 5:
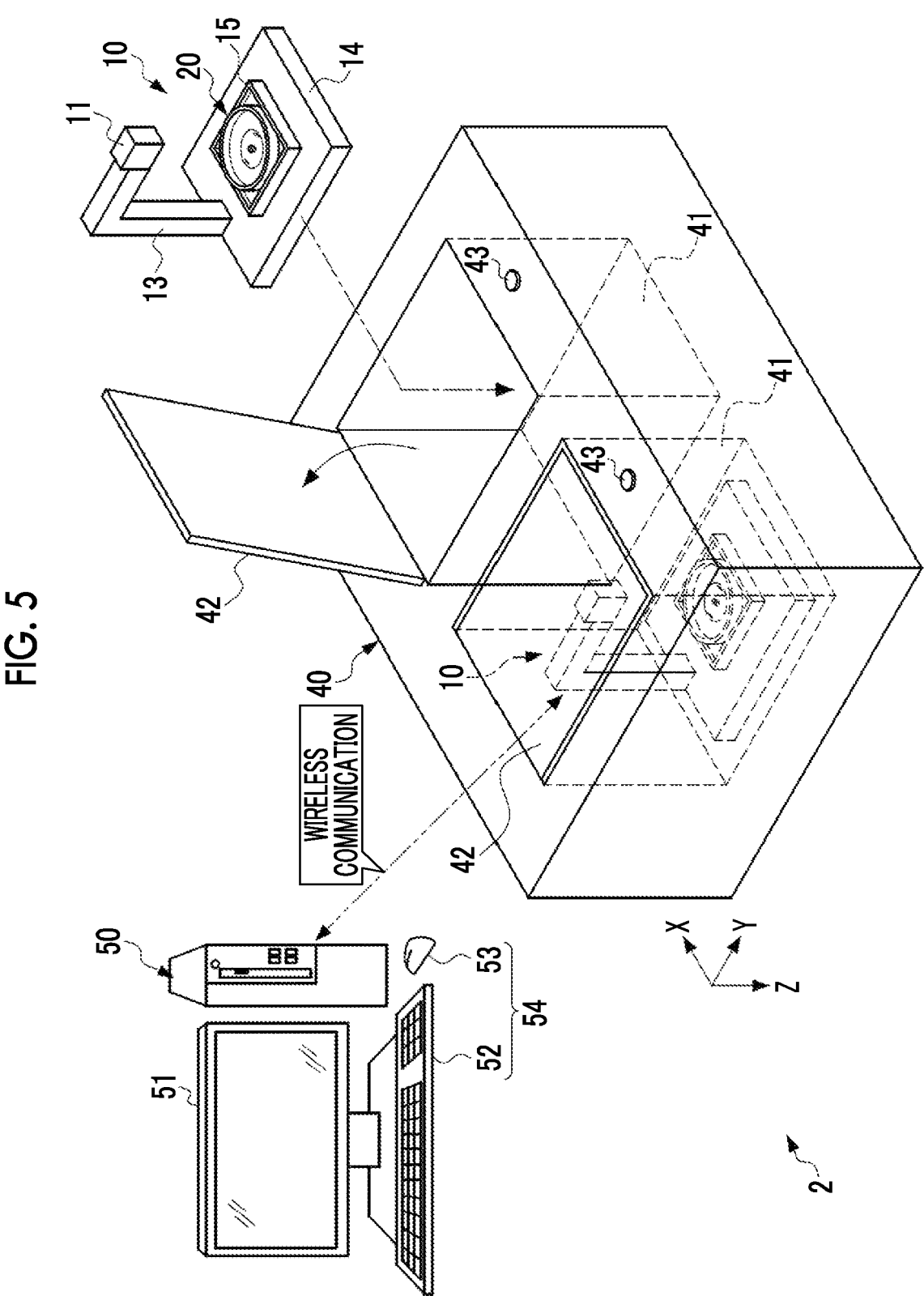
FIG. 5 is a schematic view showing an example of a configuration of an imaging system.

FIG. 5 shows an example of a configuration of an imaging system. As shown in FIG. 5, an imaging system 2 includes an imaging apparatus 10, an incubator 40, and an information processing apparatus 50. The incubator 40 is a multi-room incubator for fertilized eggs and is also called an embryo culture device. The fertilized eggs 21 are cultured in the incubator 40 for a predetermined period (for example, 7 days).

The incubator 40 has a plurality of culture rooms 41 rather than one culture room like a general incubator for culturing a cell other than the fertilized egg. This is to manage the fertilized eggs 21 individually so as not to be confused with the fertilized egg 21 of another person by accommodating the imaging apparatus 10 in each of the culture rooms 41. The culture room 41 is also called a culture chamber. Although the incubator 40 shown in FIG. 5 is provided with two culture rooms 41, the number of the culture rooms 41 is not limited thereto and can be changed as appropriate.

Each of the culture rooms 41 is provided with an openable and closable lid 42. The incubator 40 is provided with a switch 43 for opening and closing the lid 42 for each culture room 41. In a case where a user operates the switch 43, the lid 42 is opened and closed by a drive mechanism (not shown). The lid 42 may be manually opened and closed. The culture room 41 is kept airtight in a case where the lid 42 is closed.

A mixed gas obtained by mixing carbon dioxide ($CO_2$) gas and nitrogen ($N_2$) gas with outside air is supplied to the culture room 41 from an external gas cylinder (not shown) via a high efficiency particulate air (HEPA) filter. A heater (not shown) is provided on side surfaces and a bottom surface of the culture room 41. A culture environment of the culture room 41 is kept constant by controlling the concentration, temperature, and humidity of the mixed gas to be constant.

The imaging apparatus 10 has a size enough to be taken in and out of the culture room 41. As shown in FIG. 5, one imaging apparatus 10 is inserted into one culture room 41. That is, the lid 42 can be closed in a state where the imaging apparatus 10 on which the culture container 20 is placed is inserted into the culture room 41. Thus, while the fertilized egg 21 is cultured in the culture room 41, the fertilized egg 21 can be imaged by the imaging apparatus 10 without taking out the culture container 20 from the culture room 41.

The information processing apparatus 50 is, for example, a desktop personal computer. A display 51, a keyboard 52, and a mouse 53 are connected to the information processing apparatus 50. The keyboard 52 and the mouse 53 constitute an input device 54 for the user to input information. The input device 54 also includes a touch panel and the like.

The information processing apparatus 50 exchanges data with the imaging apparatus accommodated in each of the culture rooms 41 by wireless communication. The imaging apparatus 10 performs imaging periodically (for example, every 5 to 15 minutes). The information processing apparatus 50 periodically receives image data including the interference fringe image 33 (see FIG. 4) from the imaging apparatus 10, performs a reconstruction process based on the received image data, and displays a reconstructed image generated by the reconstruction process. The reconstructed image is also called a tomographic image.

Figure 6:
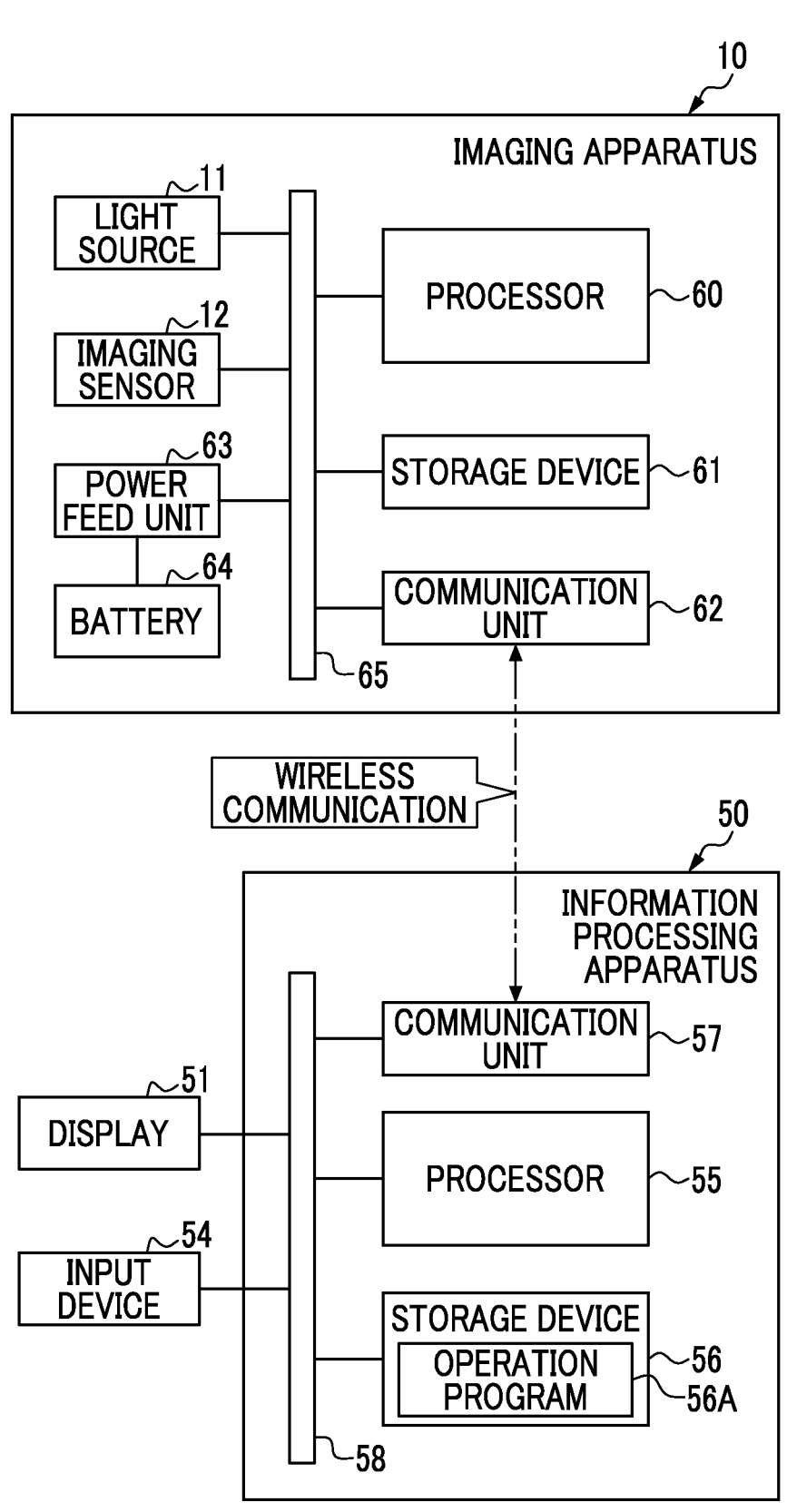
FIG. 6 is a block diagram showing an example of an internal configuration of the imaging apparatus and an information processing apparatus.

FIG. 6 shows an example of an internal configuration of the imaging apparatus 10 and the information processing apparatus 50. As shown in FIG. 6, in addition to the light source 11 and the imaging sensor 12, the imaging apparatus 10 comprises a processor 60, a storage device 61, a communication unit 62, a power feed unit 63, and a battery 64, which are interconnected via a busline 65.

The processor 60 is, for example, a field programmable gate array (FPGA) and controls an operation of each part in the imaging apparatus 10. The storage device 61 is a random access memory (RAM), a flash memory, or the like. The storage device 61 stores the image data generated by the imaging apparatus 10 and various kinds of data.

The communication unit 62 performs wireless communication with the information processing apparatus 50. The processor 60 transmits the image data to the information processing apparatus 50 via the communication unit 62.

The battery 64 is a secondary battery such as a lithium polymer battery. The power feed unit 63 includes a power supply circuit and a charge control circuit. The power feed unit 63 supplies power supplied from the battery 64 to the processor 60. In addition, the power feed unit 63 controls charging of the battery 64 by power supplied from the outside. The power feed unit 63 may be configured to charge the battery 64 wirelessly.

The information processing apparatus 50 comprises a processor 55, a storage device 56, and a communication unit 57, which are interconnected via a busline 58. The display 51 and the input device 54 described above are connected to the busline 58.

The processor 55 is composed of, for example, a central processing unit (CPU), and realizes various functions by reading out an operation program 56A and various kinds of data stored in the storage device 56 and executing processing.

The storage device 56 includes, for example, a RAM, a read only memory (ROM), and a storage. The RAM is, for example, a volatile memory used as a work area or the like. The ROM is, for example, a non-volatile memory such as a flash memory that holds the operation program 56A and various kinds of data. The storage is, for example, a hard disk drive (HDD) or a solid state drive (SSD). The storage stores an operating system (OS), an application program, image data, various kinds of data, and the like.

The communication unit 57 performs wireless communication with the communication unit 62 of the imaging apparatus 10. The processor 55 receives the image data transmitted from the imaging apparatus 10 via the communication unit 57. In addition, the processor 55 transmits, to the imaging apparatus 10, a control signal for controlling imaging via the communication unit 57.

The display 51 displays various screens. The information processing apparatus 50 receives input of an operation instruction from the input device 54 through various screens.

Figure 7:
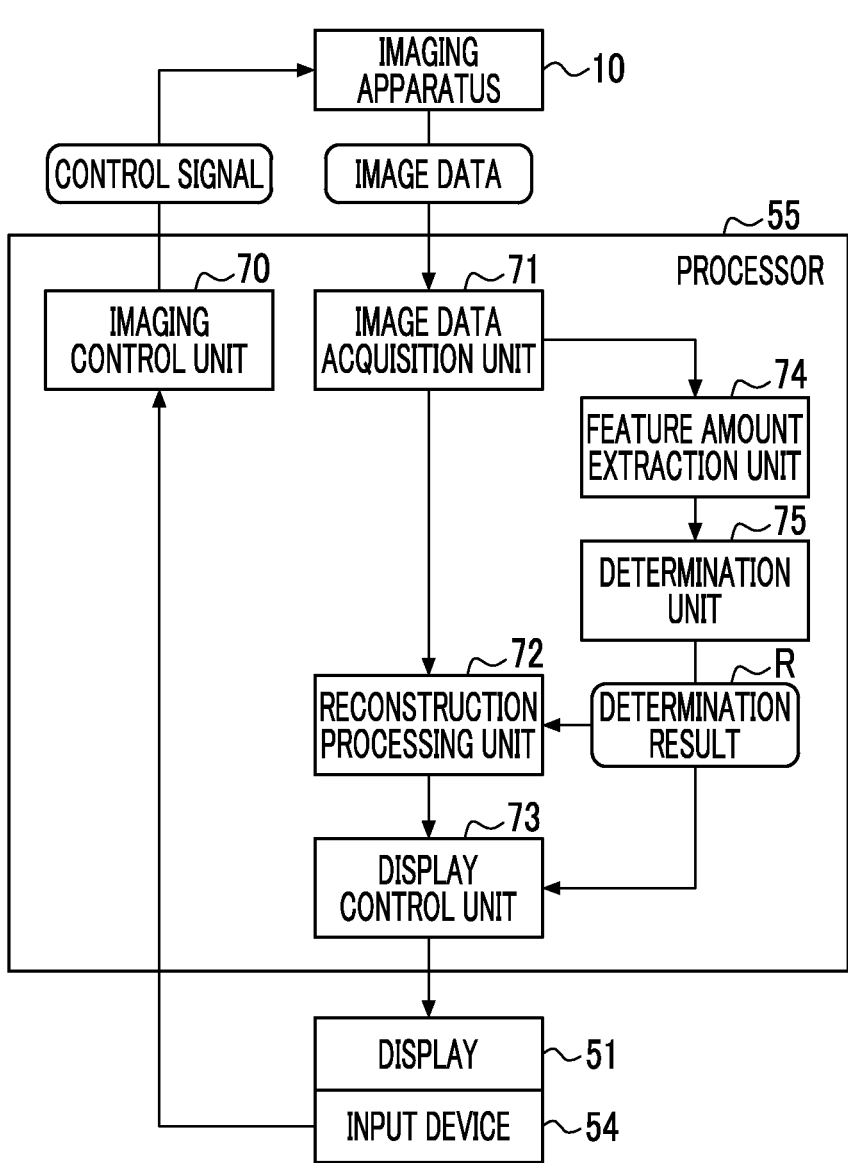
FIG. 7 is a block diagram showing an example of a functional configuration of the information processing apparatus.

FIG. 7 shows an example of a functional configuration of the information processing apparatus 50. The function of the information processing apparatus 50 is realized by the processor 55 executing processing based on the operation program 56A. As shown in FIG. 7, the processor 55 includes an imaging control unit 70, an image data acquisition unit 71, a reconstruction processing unit 72, a display control unit 73, a feature amount extraction unit 74, and a determination unit 75.

The imaging control unit 70 controls an operation of the imaging apparatus 10. Specifically, the imaging control unit 70 controls an operation of generating the illumination light 16 by the light source 11 and an imaging operation of the imaging sensor 12 by transmitting a control signal to the imaging apparatus 10. Hereinafter, the operation of generating the illumination light 16 by the light source 11 and the imaging operation of the imaging sensor 12 are collectively referred to as an imaging operation of the imaging apparatus 10. The imaging control unit 70 causes the imaging apparatus 10 to start the imaging operation based on an operation signal input from the input device 54.

The image data acquisition unit 71 acquires generated image data transmitted from the imaging apparatus 10 after the imaging apparatus 10 images the fertilized egg 21 in the culture container 20. The image data acquisition unit 71 supplies the acquired image data to the reconstruction processing unit 72.

Figure 8:
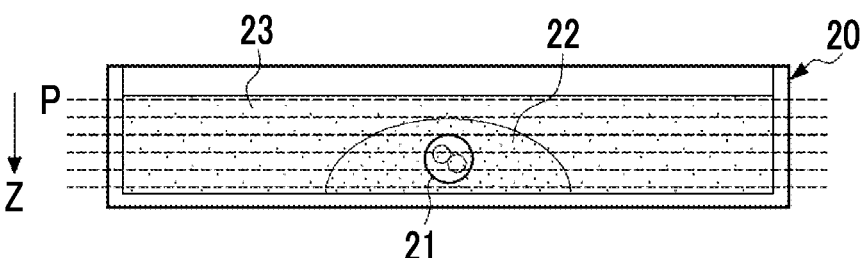
FIG. 8 is a diagram showing an example of a reconstruction position.

The reconstruction processing unit 72 generates a reconstructed image by performing an operation based on the image data. For example, as shown in FIG. 8, the reconstruction processing unit 72 changes a reconstruction position P by a certain value in the Z direction, and generates the reconstructed image each time the reconstruction position P is changed. The reconstruction position P is a position (so-called depth position) represented by a distance d from the imaging surface 12A of the imaging sensor 12 in a direction of the light source 11. Hereinafter, the reconstruction position P is also referred to as a focal position.

The reconstruction processing unit 72 performs a reconstruction process based on, for example, Fresnel transform equations represented by Equations (1) to (3).

$$r(m,n) = \frac{i}{\lambda d}exp\left(-i\frac{2\pi}{\lambda}d\right)exp\left[-i\pi\lambda d\left(\frac{m^2}{N_x^2\Delta x^2} + \frac{n^2}{N_y^2\Delta y^2}\right)\right]\times \tag{1}$$

$$\sum_{x=0}^{N_x-1}\sum_{y=0}^{N_y-1}I(x,y)exp\left[-i\frac{\pi}{\lambda d}(x^2\Delta x^2 + y^2\Delta y^2)\right]exp\left[i2\pi\left(\frac{xm}{N_x^2} + \frac{yn}{N_y^2}\right)\right]$$

$$A_0(m,n) = |\Gamma(m,n)|^2 \tag{2}$$

$$\varphi_0(m,n) = \arctan\frac{Im[\Gamma(m,n)]}{Re[\Gamma(m,n)]} \tag{3}$$

Here, I(x,y) represents image data. x represents coordinates of the pixel 12B (see FIG. 3) of the imaging sensor 12 in the X direction. y represents coordinates of the pixel 12B in the Y direction. $\Delta x$ is the above-described first arrangement pitch, and $\Delta y$ is the above-described second arrangement pitch (see FIG. 3). $\lambda$ is a wavelength of the illumination light 16.

As shown in Equation (1), $\Gamma(m,n)$ represents a complex amplitude image in which an interference fringe image included in the image data is Fresnel-transformed. Here, m=1, 2, 3, . . . , Nx−1 and n=1, 2, 3, . . . , Ny−1. Nx represents the number of pixels in the X direction of the image data. Ny represents the number of pixels in the Y direction of the image data.

As shown in Equation (2), $A_0(m,n)$ represents an intensity distribution image representing an intensity component of the complex amplitude image $\Gamma(m,n)$. As shown in Equation (3), $\varphi_0(m,n)$ represents a phase distribution image representing a phase component of the complex amplitude image $\Gamma(m,n)$.

The reconstruction processing unit 72 obtains the complex amplitude image $\Gamma(m,n)$ based on Equation (1), and applies the obtained complex amplitude image $\Gamma(m,n)$ to Equation (2) or Equation (3), whereby the intensity distribution image $A_0(m,n)$ or the phase distribution image $\varphi_0(m,n)$ is obtained. The reconstruction processing unit 72 obtains any one of the intensity distribution image $A_0(m,n)$ or the phase distribution image $\varphi_0(m,n)$ and outputs the obtained image as the reconstructed image.

In the present embodiment, the reconstruction processing unit 72 outputs the phase distribution image $\varphi_0(m,n)$ as the reconstructed image. The phase distribution image $\varphi_0(m,n)$ is an image showing a refractive index distribution of the observation object. Since the fertilized egg 21, which is the observation object in the present embodiment, is translucent, a major part of the illumination light 16 is transmitted or diffracted without being absorbed by the fertilized egg 21, so that almost no image appears in the intensity distribution. Therefore, in the present embodiment, it is preferable to use the phase distribution image $\varphi_0(m,n)$ as the reconstructed image.

The reconstruction processing unit 72 is not limited to the method using the Fresnel transform equation, and may perform the reconstruction process by a Fourier iterative phase retrieval method or the like.

The display control unit 73 causes the display 51 to display the reconstructed image generated by the reconstruction processing unit 72. The display 51 may display the reconstructed image at one focal position or may display the reconstructed image at a plurality of focal positions. In addition, the focal position of the reconstructed image displayed on the display 51 may be settable or selectable by the user operating the input device 54.

Since the fertilized egg 21 has a thickness of about 100 to 200 μm and floats in the culture solution 22, it is difficult to adjust the focal position with respect to a pronucleus or the like inside the fertilized egg 21 in the microscopy in the related art. Therefore, for example, in the related art disclosed in JP2018-093795A, a plurality of images having different focal positions are captured. On the other hand, in the lens-free imaging of the present disclosure, it is possible to generate a reconstructed image at an optional focal position based on the image data obtained in one imaging.

The feature amount extraction unit 74 extracts a feature amount of the image from the image data acquired by the image data acquisition unit 71. For example, the feature amount extraction unit 74 searches for the interference fringe image 33 from the image data by performing template matching on the image data using the interference fringe image 33 shown in FIG. 4 as a template. The feature amount extraction unit 74 outputs, as the feature amount, a correlation value representing a degree of matching between the image included in the image data and the interference fringe image 33 to the determination unit 75.

The determination unit 75 determines a quality of the interference fringe image included in the image data acquired by the image data acquisition unit 71 based on the feature amount input from the feature amount extraction unit 74. Here, the "quality" corresponds to a degree of similarity to the interference fringe image 33 obtained by imaging the fertilized egg 21. The quality of the interference fringe image to be determined is higher as the degree of similarity of the fertilized egg 21 to the interference fringe image 33 of the fertilized egg 21 is higher. For example, in a case where the feature amount represents the correlation value of the template matching, the determination unit 75 determines the quality of the interference fringe image based on whether or not the correlation value is equal to or greater than a reference value.

The determination unit 75 outputs a determination result R of the quality of the interference fringe image to the reconstruction processing unit 72 and the display control unit 73. The determination result R includes information indicating whether or not to continue the reconstruction process by the reconstruction processing unit 72 according to the quality of the interference fringe image. For example, the determination result R includes a permission signal R1 for permitting execution of the reconstruction process in a case where the quality of the interference fringe image is equal to or greater than a certain level (that is, the correlation value is equal to or greater than a reference value), or a non-permission signal R2 for not permitting execution of the reconstruction process in a case where the quality of the interference fringe image is less than a certain level (that is, the correlation value is less than a reference value).

The reconstruction processing unit 72 determines whether or not the reconstruction process can be executed based on the determination result R input from the determination unit 75. In a case where the permission signal R1 is included in the determination result R, the reconstruction processing unit 72 executes the reconstruction process. In addition, in a case where the non-permission signal R2 is included in the determination result R, the reconstruction processing unit 72 does not execute the reconstruction process.

The display control unit 73 causes the display 51 to display a message based on the determination result R input from the determination unit 75. For example, in a case where the determination result R includes the non-permission signal R2, the display control unit 73 causes the display 51 to display a message indicating that the reconstruction process is not executed because the quality of the interference fringe image is low. In this case, it is preferable that the display control unit 73 causes the display 51 to display a message prompting the user to execute re-imaging. In addition, in this case, since the interference fringe image may deteriorate due to adhesion or mixing of a foreign substance to the culture container 20 or the lid 25, it is preferable that the display control unit 73 causes the display 51 to display a message prompting the user to perform re-imaging after confirming a state of the observation object.

Figure 9:
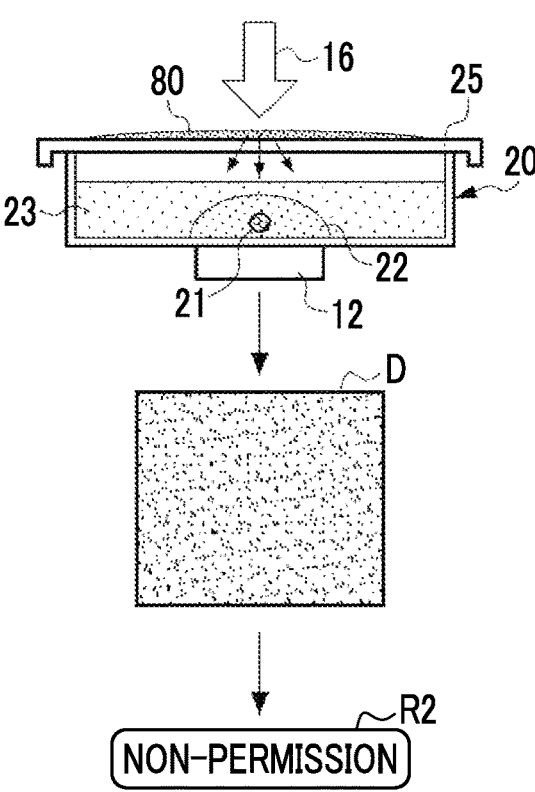
FIG. 9 is a diagram showing an example of image data generated by the imaging apparatus in a case where a water droplet adhere to a lid.
Figure 10:
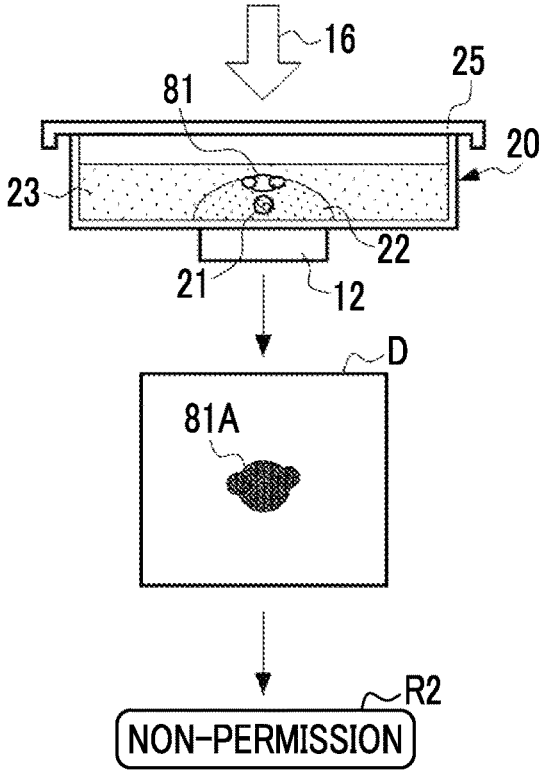
FIG. 10 is a diagram showing an example of image data generated by the imaging apparatus in a case where an air bubble is mixed in a culture solution.
Figure 11:
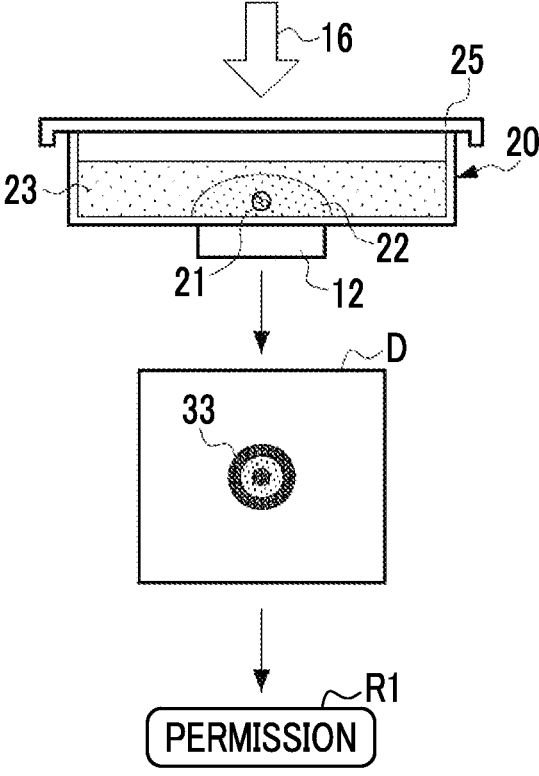
FIG. 11 is a diagram showing an example of image data generated by the imaging apparatus in a case where a water droplet does not adhere to the lid and an air bubble is not mixed in a culture solution.

FIGS. 9 to 11 show an example of the determination result R obtained by determining the quality of the interference fringe image. FIG. 9 shows an example of image data generated by the imaging apparatus 10 in a case where a water droplet 80 adheres to the lid 25. As shown in FIG. 9, in a case where the water droplet 80 adheres to the lid 25, the illumination light 16 is diffused by being incident into the water droplet 80 and becomes diffused light. In this case, the interference fringe image 33 does not appear in image data D, and the diffused light that is diffused over the entire image is imaged. In this case, the correlation value calculated by the template matching as the feature amount extracted by the feature amount extraction unit 74 is less than the reference value. As a result, the determination unit 75 determines that the quality of the interference fringe image is less than a certain level, and outputs the determination result R including the non-permission signal R2 to the reconstruction processing unit 72 and the display control unit 73.

FIG. 10 shows an example of image data generated by the imaging apparatus 10 in a case where an air bubble 81 is mixed in the culture solution 22. As shown in FIG. 10, in a case where the air bubble 81 is present in the culture solution 22, an influence of refraction of light occurs due to a difference in refractive index between the culture solution 22 and the air bubble 81 (that is, air). In this case, the interference fringe image 33 does not appear in image data D, and only a shadow 81A of the air bubble 81 is imaged. In this case, the correlation value calculated by the template matching as the feature amount extracted by the feature amount extraction unit 74 is less than the reference value. As a result, the determination unit 75 determines that the quality of the interference fringe image is less than a certain level, and outputs the determination result R including the non-permission signal R2 to the reconstruction processing unit 72 and the display control unit 73.

FIG. 11 is a diagram showing an example of image data generated by the imaging apparatus 10 in a case where the water droplet does not adhere to the lid 25 and an air bubble is not mixed in the culture solution 22. As shown in FIG. 11, in a case where the fertilized egg 21 is imaged satisfactorily, the image data D includes the interference fringe image 33 based on the fertilized egg 21. In this case, the correlation value calculated by the template matching as the feature amount extracted by the feature amount extraction unit 74 is equal to or greater than the reference value. As a result, the determination unit 75 determines that the quality of the interference fringe image is equal to or greater than a certain level, and outputs the determination result R including the permission signal R1 to the reconstruction processing unit 72 and the display control unit 73.

In other words, in the present embodiment, the determination unit 75 determines the presence or absence of the interference fringe image 33 in the image data, and outputs the determination result R according to the presence or absence of the interference fringe image 33. That is, in the present embodiment, whether or not the reconstruction process can be executed is determined based on the presence or absence of the interference fringe image 33.

Figure 12:
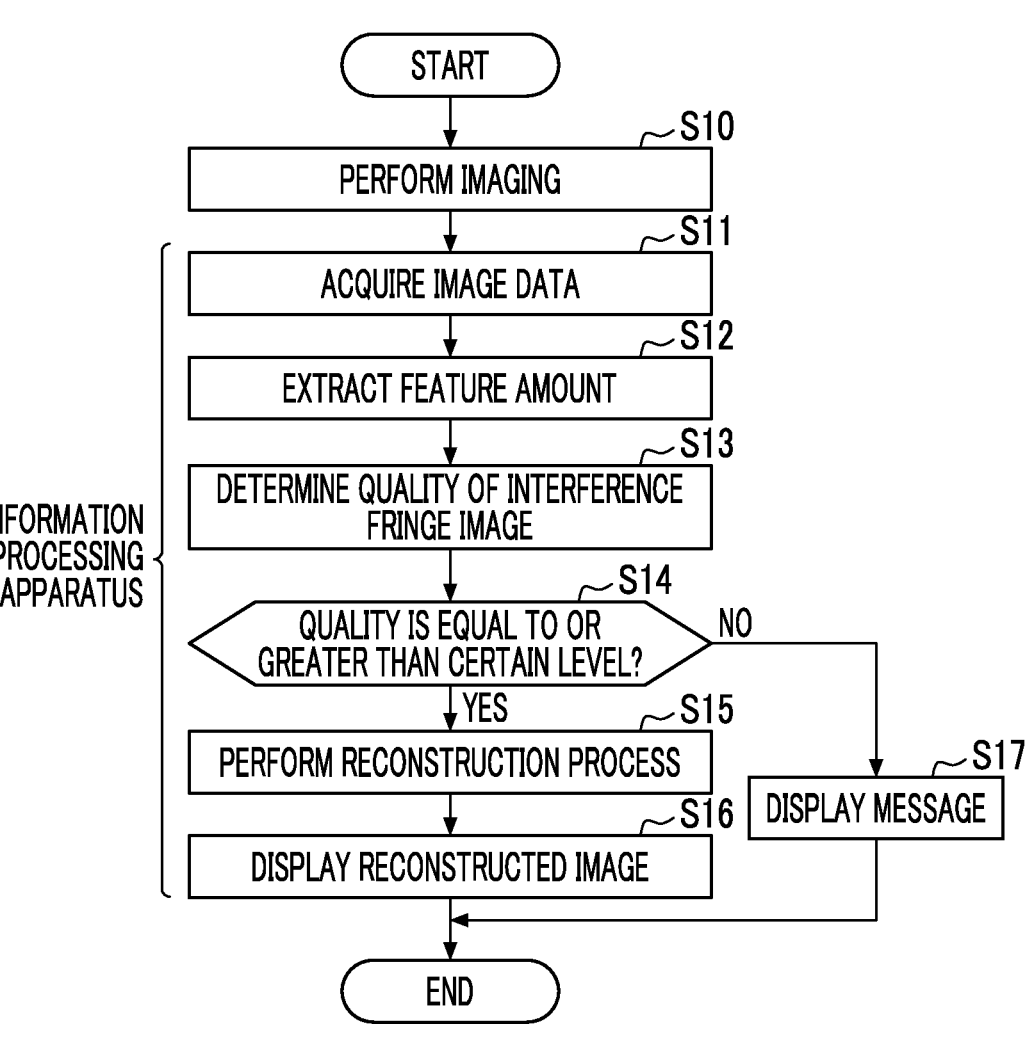
FIG. 12 is a flowchart showing an example of the overall operation of the imaging system.

Next, an example of the overall operation of the imaging system 2 will be described with reference to a flowchart shown in FIG. 12. First, the user places the culture container 20 on the stage 15 of the imaging apparatus 10, and then inserts the imaging apparatus 10 into the culture room 41 of the incubator 40. The imaging apparatus 10 need only be inserted into at least one of the plurality of culture rooms 41.

Next, the user closes the lid 42 of the culture room 41 and causes the incubator 40 to start culturing. In a case where the incubator 40 starts culturing, the imaging apparatus 10 images the fertilized egg 21 in the culture container 20 under the control from the information processing apparatus 50 (Step S10). The imaging apparatus 10 transmits the image data generated by performing the imaging operation to the information processing apparatus 50.

The information processing apparatus 50 acquires the image data transmitted from the imaging apparatus 10 by the image data acquisition unit 71 (Step S11). The feature amount extraction unit 74 of the information processing apparatus 50 extracts the feature amount from the image data acquired by the image data acquisition unit 71 (Step S12). For example, the feature amount extraction unit 74 extracts, as the feature amount, the correlation value representing the degree of matching with the interference fringe image 33 by the template matching.

Next, the determination unit 75 determines the quality of the interference fringe image included in the image data based on the feature amount extracted by the feature amount extraction unit 74, and outputs the determination result R to the reconstruction processing unit 72 and the display control unit 73 (Step S13).

In a case where the quality of the interference fringe image is equal to or greater than a certain level (Step S14: YES), the permission signal R1 is output from the determination unit 75 to the reconstruction processing unit 72 and the display control unit 73 as the determination result R. In this case, the reconstruction processing unit 72 generates the reconstructed image by executing the reconstruction process based on the image data acquired by the image data acquisition unit 71 (Step S15). The display control unit 73 causes the display 51 to display the reconstructed image generated by the reconstruction processing unit 72 (Step S16).

On the other hand, in a case where the quality of the interference fringe image is less than a certain level (Step S14: NO), the non-permission signal R2 is output from the determination unit 75 to the reconstruction processing unit 72 and the display control unit 73 as the determination result R. In this case, the reconstruction processing unit 72 does not execute the reconstruction process. The display control unit 73 causes the display 51 to display a message indicating that the reconstruction process is not executed because the quality of the interference fringe image is low (Step S17).

As described above, according to the imaging system 2 according to the embodiment, the quality of the interference fringe image included in the image data obtained by performing the imaging by the imaging apparatus 10 is determined, and the reconstruction process is not executed in a case where the quality is less than a certain level. Therefore, in a case where the quality of the interference fringe image is low, the user does not need to wait for the completion of the reconstruction process, and can execute the re-imaging at an early stage after confirming whether a foreign substance adheres to or is mixed in the culture container 20 or the lid 25. Therefore, the observation efficiency of the observation object is improved.

In addition, in the above embodiment, the feature amount extraction unit 74 extracts, as the feature amount, the correlation value representing the degree of matching with the interference fringe image 33 by the template matching, but may extract a frequency characteristic of the image data as the feature amount. In this case, for example, the feature amount extraction unit 74 extracts the frequency characteristic by performing frequency analysis using a Fourier transform or the like on the image data.

As shown in FIG. 11, from the image data D obtained by imaging the fertilized egg 21, a plurality of specific frequencies are extracted in a high frequency region due to a streak pattern of the interference fringe image 33. On the other hand, as shown in FIG. 9, in a case where the water droplet 80 adheres to the lid 25, a certain frequency characteristic caused by the diffused light is extracted from the image data D. In addition, as shown in FIG. 10, in a case where the air bubble 81 is mixed in the culture solution 22, the frequency characteristic in a low frequency region caused by the shadow 81A of the air bubble 81 is extracted from the image data D.

In this case, the determination unit 75 determines the quality of the interference fringe image based on the frequency characteristic as the feature amount. The determination unit 75 determines that the closer the frequency characteristic extracted from the image data D to be determined is closer to the frequency characteristic of the interference fringe image 33 of the fertilized egg 21, the higher the quality.

Second Embodiment

Next, a second embodiment will be described. In the second embodiment, the quality of the interference fringe image is determined based on a plurality of pieces of image data obtained by performing imaging a plurality of times.

In the second embodiment, the light source 11 may be a laser light source in which a plurality of light emitting points (for example, 36 light emitting points) are arranged in a two-dimensional array. As this laser light source, a vertical cavity surface emitting laser can be used. A plurality of pieces of image data obtained by performing an imaging operation by the imaging sensor 12 while causing the plurality of light emitting points to emit light in sequence are synthesized to obtain image data including a high-resolution interference fringe image (so-called super-resolution interference fringe image). By reconstructing this image data, a high-quality reconstructed image can be obtained.

Figure 13:
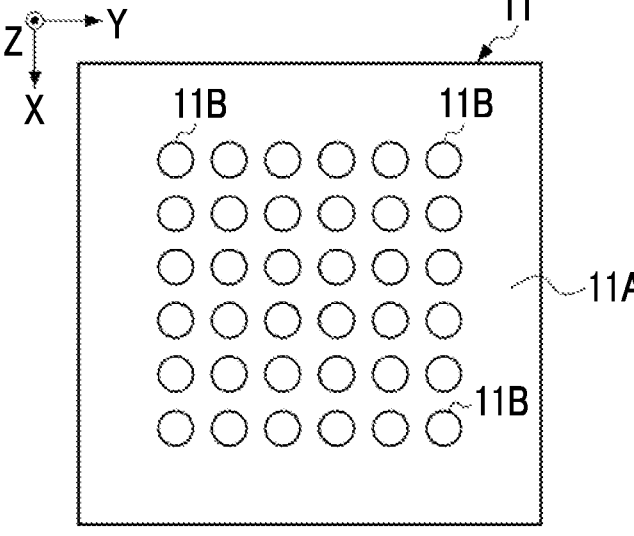
FIG. 13 is a diagram showing a configuration of a light emitting surface of a light source provided in the imaging apparatus according to a second embodiment.

FIG. 13 is a diagram showing a configuration of the light emitting surface 11A of the light source 11 provided in the imaging apparatus 10 according to the second embodiment. The light emitting surface 11A is disposed at a position facing the imaging sensor 12. The plurality of light emitting points 11B are arranged in a two-dimensional array on the light emitting surface 11A. An arrangement pitch of the light emitting points 11B is about 10 μm to 100 μm. The light emitting points 11B are sequentially selected to emit the illumination light 16. An emission time interval of the plurality of light emitting points 11B is several milliseconds.

The arrangement pitch of the light emitting points 11B need only be different from the arrangement pitch (first arrangement pitch $\Delta x$ and second arrangement pitch $\Delta y$) of the pixels 12B, and does not necessarily have to be smaller than the arrangement pitch of the pixels 12B. For example, even though the light emitting point 11B is located directly above the adjacent pixel 12B, the arrangement pitch of the light emitting points 11B need not match the arrangement pitch of the pixels 12B. In this case, since different positions on the pixel 12B are illuminated with the illumination light 16, in a case of synthesizing the plurality of pieces of image data, it is possible to generate image data including a super-resolution interference fringe image by regarding the different pixels 12B, which are directly below the respective light emitting points 11B and are illuminated with the illumination light 16, as the same pixel and performing registration with an accuracy of 1 pixel or less.

In FIG. 13, the light emitting points 11B are arranged in a 6×6 square array, and 36 light emitting points 11B are provided on the light emitting surface 11A. However, the number and the arrangement pattern of the light emitting points 11B are not limited to the number and the arrangement pattern shown in FIG. 13, and the higher the number of the light emitting points 11B, the higher the resolution of the interference fringe image can be achieved, while the longer the operation time of the synthesis process and the reconstruction process. Therefore, it is preferable to optimize the number of the light emitting points 11B in accordance with the required image quality and operation time.

The imaging sensor 12 performs an imaging operation each time each of the light emitting points 11B emits light to generate image data. The imaging apparatus 10 transmits the plurality of pieces of image data obtained by performing the imaging by the imaging sensor 12 a plurality of times, to the information processing apparatus 50.

Figure 14:
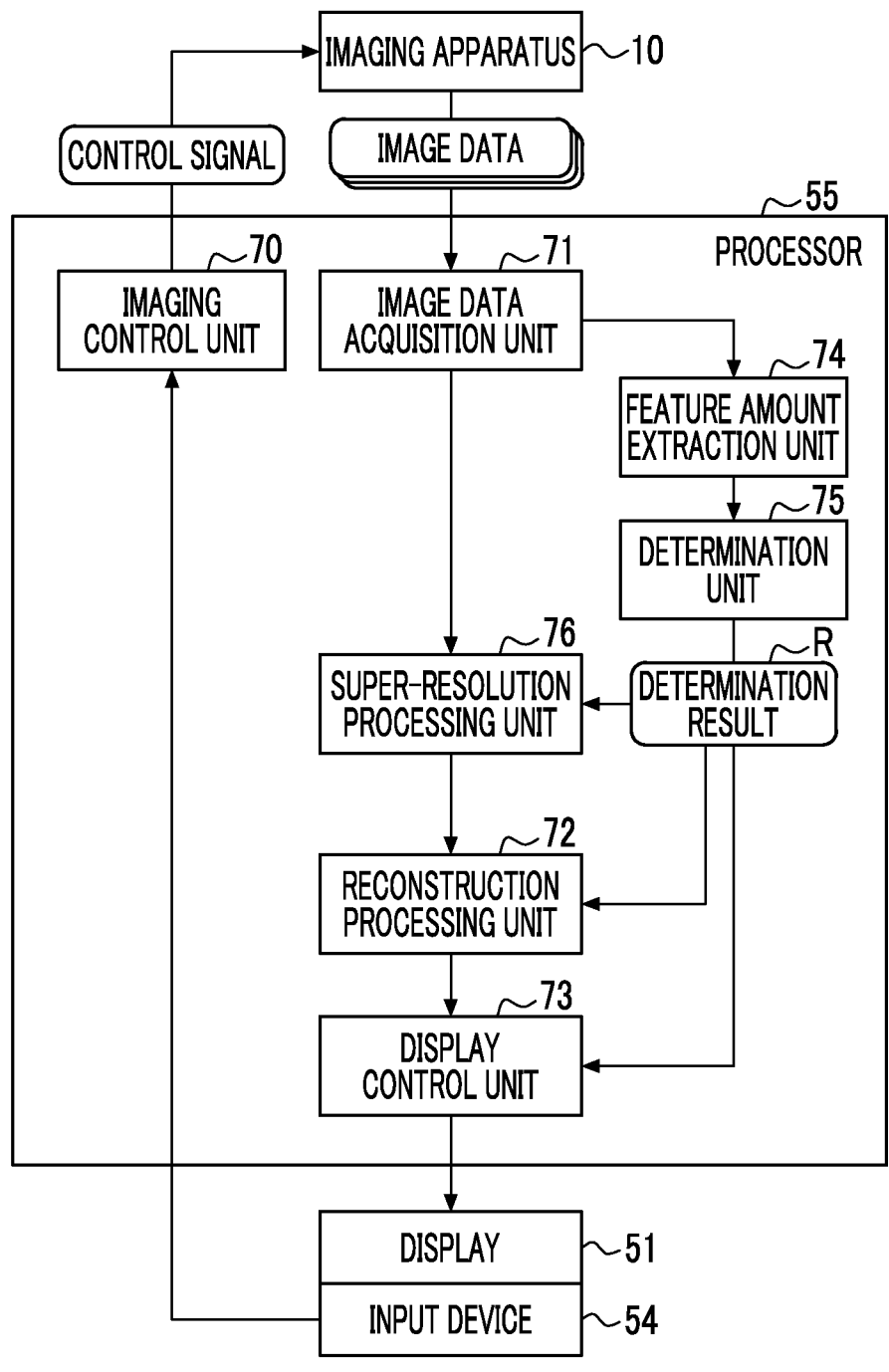
FIG. 14 is a block diagram showing an example of a functional configuration of the information processing apparatus according to the second embodiment.

FIG. 14 shows an example of a functional configuration of the information processing apparatus 50 according to the second embodiment. As shown in FIG. 14, in the second embodiment, the processor 55 includes a super-resolution processing unit 76 in addition to the imaging control unit 70, the image data acquisition unit 71, the reconstruction processing unit 72, the display control unit 73, the feature amount extraction unit 74, and the determination unit 75.

Figure 15:
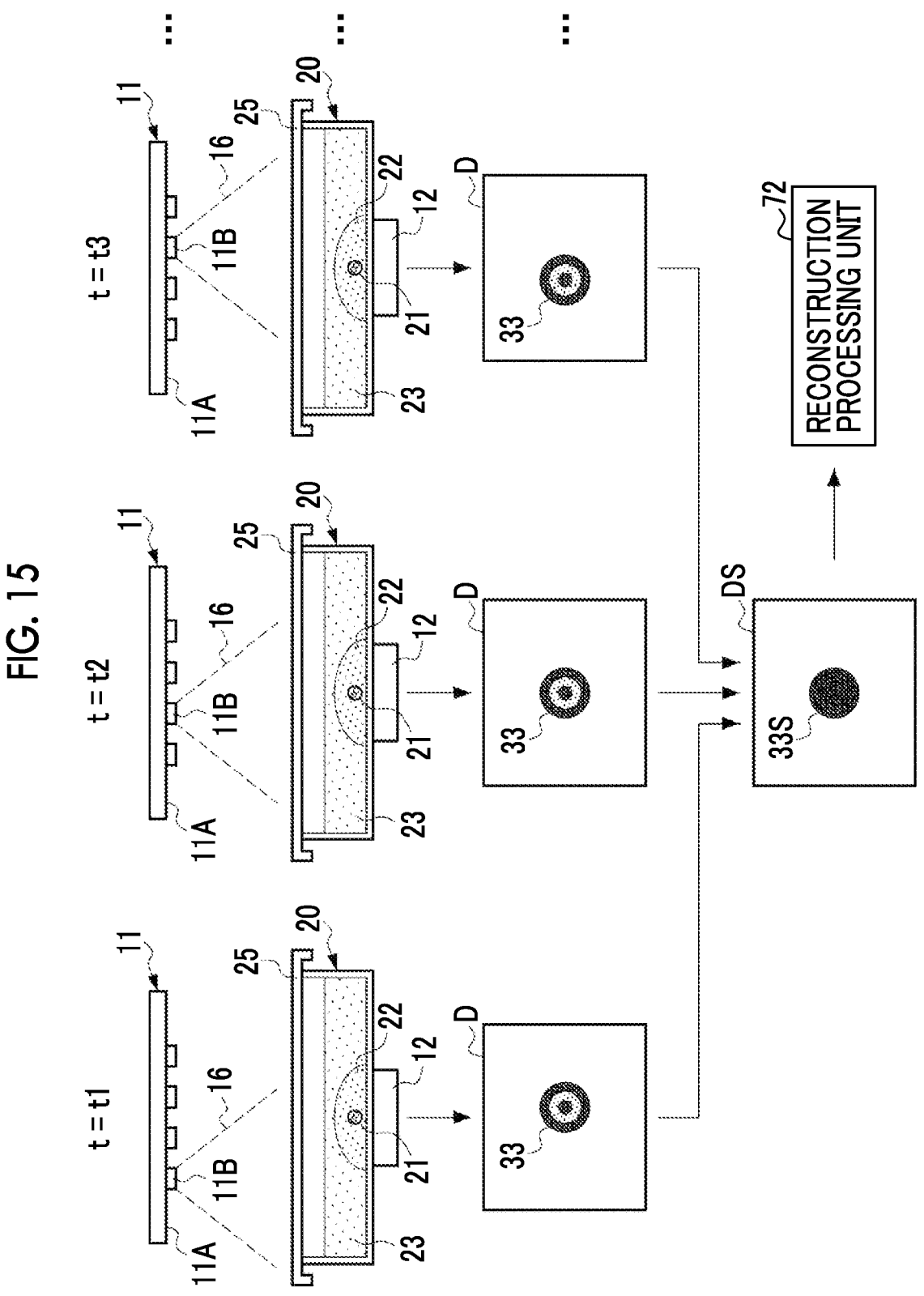
FIG. 15 is a diagram schematically illustrating super-resolution processing by a super-resolution processing unit.

FIG. 15 schematically shows a super-resolution process by the super-resolution processing unit 76. As shown in FIG. 15, the plurality of light emitting points 11B provided in the light source 11 emit light one by one in sequence according to the control from the imaging control unit 70. In FIG. 15, t represents a time point. The light emitting points 11B that emit light at respective time points tin the time series t=t1, t2, t3, . . . , are different from each other.

The positions of the interference fringe images 33 included in pieces of the image data D obtained by performing the imaging by the imaging sensor 12 at respective time points tin the time series t=t1, t2, t3, . . . , are shifted in the pieces of image data D because the light emitting points 11B are different from each other. The super-resolution processing unit 76 generates image data DS including a super-resolution interference fringe image 33S by synthesizing a plurality of pieces of the image data D after performing registration therebetween. The super-resolution processing unit 76 outputs the generated image data DS to the reconstruction processing unit 72.

Figure 16:
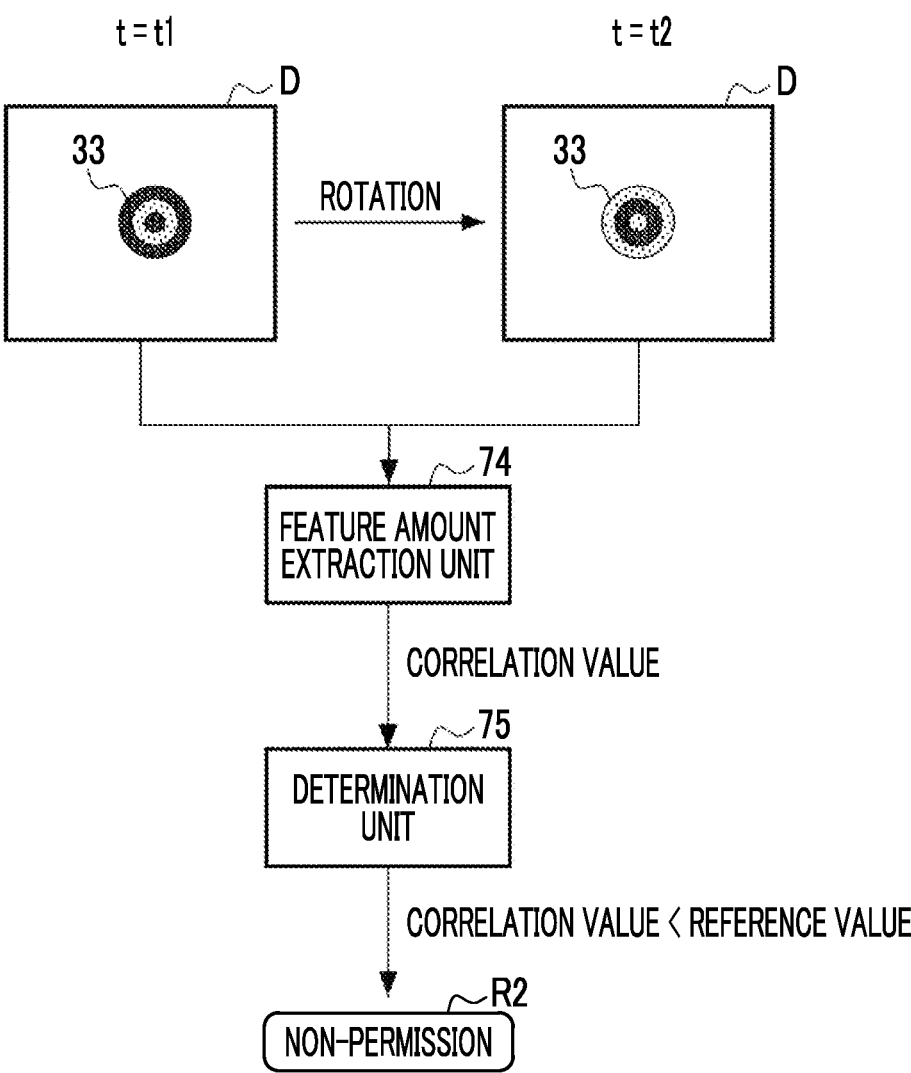
FIG. 16 is a diagram showing an example in which a pattern of an interference fringe image changes due to rotation of a fertilized egg.
Figure 17:
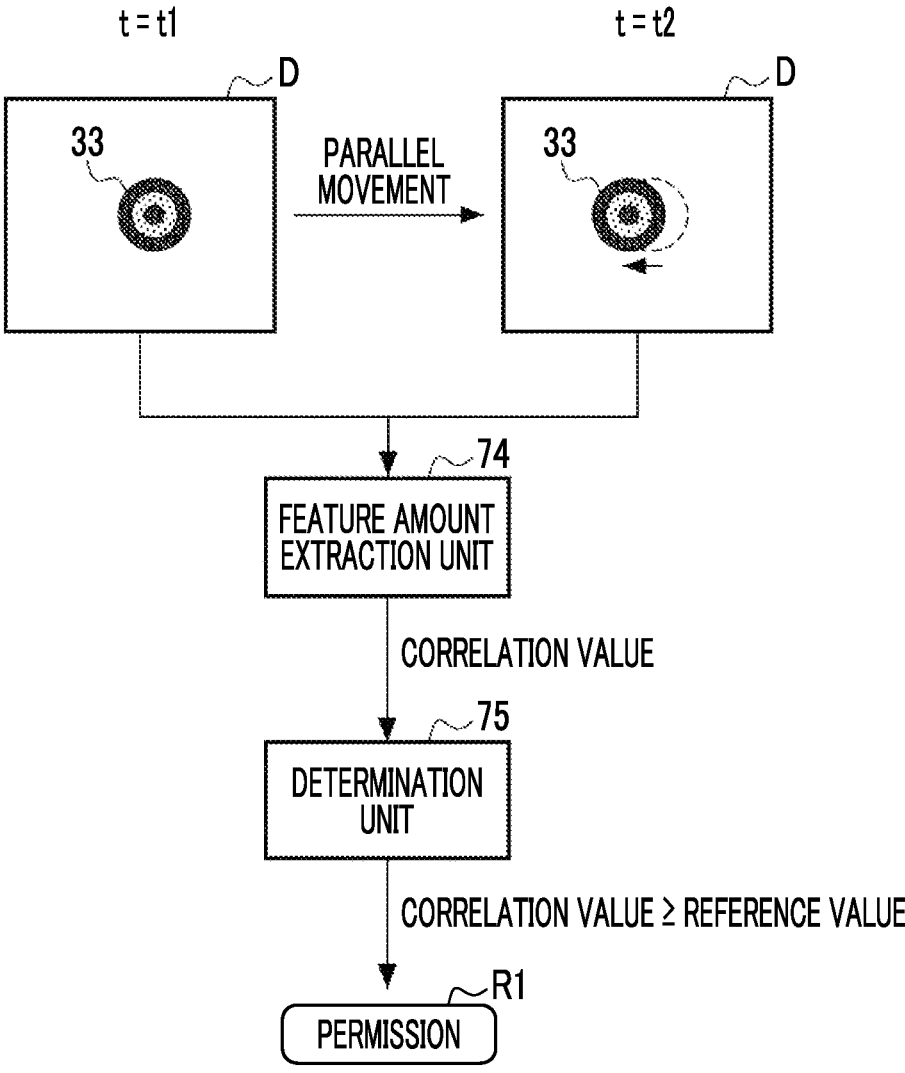
FIG. 17 is a diagram showing an example in which an interference fringe image moves linearly due to a parallel movement of a fertilized egg.

FIG. 16 and FIG. 17 illustrate the processing of the feature amount extraction unit 74 and the determination unit 75 according to the second embodiment. In the present embodiment, the feature amount extraction unit 74 calculates, as the feature amount, a correlation value between the interference fringe images that are continuous in time series, for the plurality of pieces of image data D. The determination unit 75 determines whether or not the correlation value is equal to or greater than a reference value. In a case where the correlation value is equal to or greater than the reference value, the determination unit 75 determines that the quality of the interference fringe image is equal to or greater than a certain level, and outputs the determination result R including the permission signal R1. In addition, in a case where the correlation value is less than the reference value, the determination unit 75 determines that the quality of the interference fringe image is less than a certain level, and outputs the determination result R including the non-permission signal R2.

The feature amount extraction unit 74 is not limited to the correlation value between the interference fringe images that are continuous in time series, and may calculate a difference value between the interference fringe images that are continuous in time series, as the feature amount. Even in a case where the fertilized egg 21 moves in parallel, the difference value can be calculated by performing registration between the interference fringe images that are continuous in time series and then taking a difference. That is, the feature amount extraction unit 74 need only calculate the feature amount based on a temporal change of the interference fringe images that are continuous in time series.

FIGS. 16 and 17 show an example of calculating a correlation value between the image data D obtained at a time point t1 and the image data D obtained at a time point t2.

FIG. 16 shows an example in which the pattern of the interference fringe image 33 in the image data D is changed by the rotation of the fertilized egg 21 between the time point t1 and the time point t2. Since the fertilized egg 21 floats in the culture solution 22, the rotation is likely to occur. In a case where the fertilized egg 21 is rotated, the position of the pronucleus or the like inside the fertilized egg 21 is changed, so that the pattern of the interference fringe image 33 is changed. Thus, in a case where the pattern of the interference fringe image 33 is changed by the rotation of the fertilized egg 21, the correlation value calculated by the feature amount extraction unit 74 is less than the reference value. In this case, the determination unit 75 determines that the quality of the interference fringe image is less than a certain level, and outputs the determination result R including the non-permission signal R2.

Assuming that the super-resolution process is performed using the plurality of pieces of image data D in which the interference fringe image 33 is changed in this way, the image quality of the image data DS generated by the super-resolution process deteriorates. Therefore, in the present embodiment, the execution of the super-resolution process is prohibited in a case where it is assumed that the image quality of the image data DS deteriorates based on the correlation value as described above.

FIG. 17 shows an example in which the interference fringe image 33 in the image data D moves linearly by the parallel movement of the fertilized egg 21 between the time point t1 and the time point t2. In a case where the fertilized egg 21 moves in parallel, no pattern change occurs in the interference fringe image 33. Thus, in a case where the interference fringe image 33 moves linearly by the parallel movement of the fertilized egg 21, the correlation value calculated by the feature amount extraction unit 74 is equal to or greater than the reference value. In this case, the determination unit 75 determines that the quality of the interference fringe image is equal to or greater than a certain level, and outputs the determination result R including the permission signal R1.

Even in a case where the interference fringe image 33 moves linearly, the super-resolution processing unit 76 can perform registration between the interference fringe images 33, so that the image quality of the image data DS generated by the super-resolution processing unit 76 does not deteriorate.

The pattern change of the interference fringe image 33 may occur by cell division of the fertilized egg 21 in addition to the rotation of the fertilized egg 21. In addition, since the temperature change is large immediately after the imaging apparatus 10 is inserted into the incubator 40, a large movement may occur in the fertilized egg 21, resulting in the change in the pattern of the interference fringe image 33. As described above, in the present embodiment, whether or not the super-resolution process and the reconstruction process can be executed is determined based on the temporal change of the pattern of the interference fringe image 33.

Figure 18:
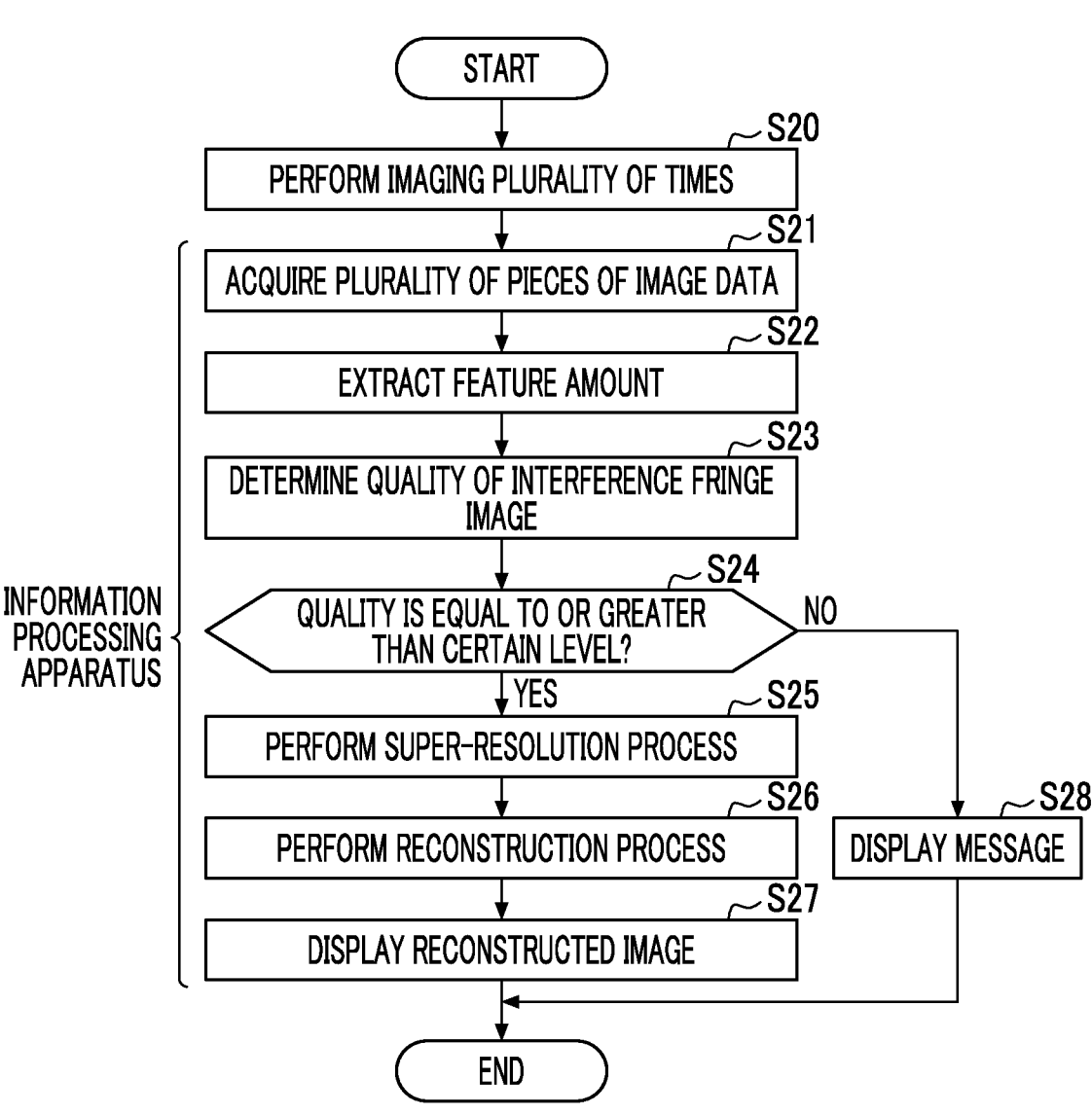
FIG. 18 is a flowchart showing an example of the overall operation of the imaging system according to the second embodiment.

Next, an example of the overall operation of the imaging system 2 according to the second embodiment will be described with reference to a flowchart shown in FIG. 18. In the present embodiment, after the culturing is started in the same manner as in the first embodiment, the imaging is performed a plurality of times while changing the light emitting point 11B of the light source 11 (Step S20). The imaging apparatus 10 transmits a plurality of pieces of image data generated by performing the imaging operation a plurality of times, to the information processing apparatus 50.

The information processing apparatus 50 acquires the plurality of pieces of image data transmitted from the imaging apparatus 10 by the image data acquisition unit 71 (Step S21). The feature amount extraction unit 74 of the information processing apparatus 50 extracts the feature amount from the plurality of pieces of image data acquired by the image data acquisition unit 71 (Step S22). In the present embodiment, a correlation value between the interference fringe images that are continuous in time series is calculated as the feature amount for the plurality of pieces of image data.

Next, the determination unit 75 determines the quality of the interference fringe image included in the image data based on the feature amount extracted by the feature amount extraction unit 74, and outputs the determination result R to the super-resolution processing unit 76, the reconstruction processing unit 72, and the display control unit 73 (Step S23). In the present embodiment, in a case where at least one of the plurality of correlation values calculated by the feature amount extraction unit 74 is less than the reference value, the determination unit 75 determines that the quality of the interference fringe image is less than a certain level, and outputs the determination result R including the non-permission signal R2. On the other hand, in a case where all of the plurality of correlation values calculated by the feature amount extraction unit 74 are equal to or greater than the reference value, the determination unit 75 determines that the quality of the interference fringe image is equal to or greater than a certain level, and outputs the determination result R including the permission signal R1.

In a case where the quality of the interference fringe image is equal to or greater than a certain level (Step S24: YES), the super-resolution processing unit 76 generates the image data including the super-resolution interference fringe image by executing the super-resolution process based on the plurality of pieces of image data acquired by the image data acquisition unit 71 (Step S25). The reconstruction processing unit 72 generates the reconstructed image by executing the reconstruction process based on the image data acquired by the super-resolution processing unit 76 (Step S26). The display control unit 73 causes the display 51 to display the reconstructed image generated by the reconstruction processing unit 72 (Step S27).

On the other hand, in a case where the quality of the interference fringe image is less than a certain level (Step S24: NO), the super-resolution processing unit 76 does not execute the super-resolution process, and the reconstruction processing unit 72 does not execute the reconstruction process. The display control unit 73 causes the display 51 to display a message indicating that the reconstruction process is not executed because the quality of the interference fringe image is low (Step S28).

As described above, according to the imaging system 2 according to the present embodiment, the quality of the interference fringe image is determined based on the temporal change of the interference fringe image included in the plurality of pieces of image data obtained by performing the imaging by the imaging apparatus 10, and the super-resolution process and the reconstruction process are not executed in a case where the quality is less than a certain level. Therefore, in a case where the quality of the interference fringe image is low, the user does not need to wait for the completion of the super-resolution process and the reconstruction process, and can execute the re-imaging at an early stage after confirming the state of the fertilized egg 21. Therefore, the observation efficiency of the observation object is improved.

In the second embodiment, the feature amount extraction unit 74 and the determination unit 75 perform processing after the imaging apparatus 10 generates a plurality of pieces of image data by performing the imaging operation a plurality of times, but may perform the processing each time the imaging apparatus 10 performs one imaging operation and generates one image data. That is, it may be determined whether or not the imaging operation can be continued based on the determination result of the quality of the interference fringe image while the imaging apparatus 10 performs the imaging a plurality of times. In this case, in a case where it is determined that the quality of the interference fringe image is less than a certain level, the imaging operation is stopped.

In addition, in the first embodiment and the second embodiment, in a case where the imaging system 2 performs the imaging operation and the reconstruction process at regular time intervals (for example, 10 minutes) (that is, in a case where time-lapse imaging is performed), whether or not the imaging operation and the reconstruction process can be continued may be determined based on the determination result of the quality of the interference fringe image. In this case, in a case where it is determined that the quality of the interference fringe image is less than a certain level, the imaging operation and the reconstruction process are stopped.

In the first embodiment and the second embodiment, the imaging apparatus 10 and the information processing apparatus 50 are separate devices, but the imaging apparatus 10 and the information processing apparatus 50 may be integrated into one apparatus. Further, the imaging apparatus 10, the information processing apparatus 50, and the incubator 40 may be integrally configured as one apparatus.

In the first embodiment and the second embodiment, the observation object is a fertilized egg, but the observation object may be a floating cell other than the fertilized egg. The floating cell is a cell that floats in a culture solution. In addition to the fertilized eggs, the floating cells include Chinese hamster ovary (CHO) cells used for antibody production.

The imaging system 2 according to the embodiment relates to a technology called lens-free imaging in which the imaging apparatus 10 does not comprise an optical lens. The technology of the present disclosure is applicable to digital holography in general (for example, in a case where reference light is used).

A hardware configuration of a computer constituting the information processing apparatus 50 can be modified in various ways. For example, the information processing apparatus 50 can be configured by a plurality of computers separated as hardware for the purpose of improving processing capacity and reliability.

As described above, the hardware configuration of the computer of the information processing apparatus 50 can be appropriately changed according to the required performance such as processing capacity, safety, and reliability. Further, not only the hardware but also the application program such as the operation program 56A can be duplicated or stored in a plurality of storage devices in a distributed manner for the purpose of securing safety and reliability.

In each of the above embodiments, for example, as a hardware structure of the processing units executing various types of processing such as the imaging control unit 70, the image data acquisition unit 71, the reconstruction processing unit 72, the display control unit 73, the feature amount extraction unit 74, the determination unit 75, and the super-resolution processing unit 76, various processors shown below can be used. As described above, the various processors include, in addition to the CPU that is a general-purpose processor that executes software (operation program 56A) to function as various processing units, a programmable logic device (PLD) that is a processor capable of changing a circuit configuration after manufacture, such as an FPGA, and an exclusive electric circuit that is a processor having a circuit configuration exclusively designed to execute specific processing, such as an application specific integrated circuit (ASIC).

One processing unit may be configured by one of the various processors or a combination of two or more processors of the same type or different types (for example, a combination of a plurality of FPGAs and/or a combination of a CPU and an FPGA). In addition, a plurality of processing units may be configured of one processor.

As an example of configuring a plurality of processing units with one processor, first, there is a form in which, as typified by computers such as a client and a server, one processor is configured by combining one or more CPUs and software, and the processor functions as a plurality of processing units. Second, there is a form in which, as typified by a system on chip (SoC) and the like, in which a processor that implements functions of an entire system including a plurality of processing units with one integrated circuit (IC) chip is used. As described above, the various types of processing units are configured using one or more of the various types of processors as a hardware structure.

Further, as the hardware structure of these various processors, more specifically, an electric circuit (circuitry) in which circuit elements such as semiconductor elements are combined can be used.

The above-described embodiments and modification examples can be appropriately combined to the extent that no contradiction occurs.

All documents, patent applications, and technical standards mentioned in this specification are incorporated herein by reference to the same extent as in a case where each document, each patent application, and each technical standard are specifically and individually described by being incorporated by reference.

What is claimed is:

1. An information processing apparatus that acquires image data from an imaging apparatus including a light source having a plurality of light emitting points, and an imaging sensor, the imaging apparatus being configured to generate the image data by capturing an interference fringe image generated by irradiating an observation object, which is a fertilized egg or a floating cell other than a fertilized egg, with illumination light, and processes the acquired image data, the information processing apparatus comprising:

a processor, wherein the processor is configured to:

extract a feature amount from a plurality of pieces of the image data generated by the imaging apparatus performing imaging operations a plurality of times while causing the plurality of light emitting points to emit light in sequence, based on a temporal change of interference fringe images that are continuous in a time series and included in the plurality of pieces of image data;

determine a quality of the interference fringe image included in each of the plurality of pieces of the image data based on the feature amount; and determine whether a reconstruction process based on the plurality of pieces of the image data is executable or not based on a determination result of the quality of the interference fringe image.

2. The information processing apparatus according to claim 1, wherein the processor is configured to extract the feature amount based on a correlation value or a difference value between the interference fringe images that are continuous in time series.

3. The information processing apparatus according to claim 1, wherein the processor is configured to:

execute a super-resolution process of generating high-resolution image data based on the plurality of pieces of image data and a reconstruction process based on image data generated by the super-resolution process; and determine whether the super-resolution process and the reconstruction process are executable or not based on a determination result of the quality of the interference fringe image.

4. An information processing method of acquiring image data from an imaging apparatus including a light source having a plurality of light emitting points, and an imaging sensor, the imaging apparatus being configured to generate the image data by capturing an interference fringe image generated by irradiating an observation object, which is a fertilized egg or a floating cell other than a fertilized egg, with illumination light, and processing the acquired image data, the information processing method comprising:

extracting a feature amount from a plurality of pieces of the image data generated by the imaging apparatus performing imaging operations a plurality of times while causing the plurality of light emitting points of the light source to emit light in sequence, based on a temporal change of interference fringe images that are continuous in a time series and included in the plurality of pieces of image data;

determining a quality of the interference fringe image included in each of the plurality of pieces the image data based on the feature amount; and determining whether a reconstruction process based on the plurality of pieces of the image data is executable or not based on a determination result of the quality of the interference fringe image.

5. A non-transitory computer-readable storage medium storing a program causing a computer to execute a process of acquiring image data from an imaging apparatus including a light source having a plurality of light emitting points, and an imaging sensor, the imaging apparatus being configured to generate the image data by capturing an interference fringe image generated by irradiating an observation object, which is a fertilized egg or a floating cell other than a fertilized egg, with illumination light, and processing the acquired image data, the process comprising:

extracting a feature amount from a plurality of pieces of the image data generated by the imaging apparatus performing imaging operations a plurality of times while causing the plurality of light emitting points of the light source to emit light in sequence, based on a temporal change of interference fringe images that are continuous in a time series and included in the plurality of pieces of image data;

determining a quality of the interference fringe image included in each of the plurality of pieces the image data based on the feature amount; and determining whether a reconstruction process based on the plurality of pieces of the image data is executable or not based on a determination result of the quality of the interference fringe image.

* * * * *